United States Patent
Wu

(10) Patent No.: US 9,182,158 B2
(45) Date of Patent: Nov. 10, 2015

(54) DUAL COOLING SYSTEMS TO MINIMIZE OFF-CYCLE MIGRATION LOSS IN REFRIGERATORS WITH A VACUUM INSULATED STRUCTURE

(71) Applicant: Whirlpool Corporation, Benton Harbor, MI (US)

(72) Inventor: Guolian Wu, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 223 days.

(21) Appl. No.: 13/832,246

(22) Filed: Mar. 15, 2013

(65) Prior Publication Data

US 2014/0260332 A1    Sep. 18, 2014

(51) Int. Cl.
| | |
|---|---|
| F25B 25/00 | (2006.01) |
| F25B 1/00 | (2006.01) |
| F25B 21/02 | (2006.01) |
| F25B 5/02 | (2006.01) |
| F25D 11/02 | (2006.01) |
| F25D 16/00 | (2006.01) |

(52) U.S. Cl.
CPC . *F25B 21/02* (2013.01); *F25B 1/00* (2013.01); *F25B 5/02* (2013.01); *F25B 25/00* (2013.01); *F25D 11/02* (2013.01); *F25D 16/00* (2013.01); *F25B 2321/0251* (2013.01); *F25D 2201/14* (2013.01)

(58) Field of Classification Search
CPC .......... F25B 25/005; F25B 1/00; F25B 25/00; F25B 2313/009
USPC ............... 62/3.2, 3.6, 344, 340, 3.7
See application file for complete search history.

(56) References Cited

U.S. PATENT DOCUMENTS

| | | | |
|---|---|---|---|
| 2,108,212 A | 2/1938 | Schellens |
| 2,128,336 A | 8/1938 | Torstensson |
| 2,164,143 A | 6/1939 | Munters |
| 2,318,744 A | 5/1943 | Brown |
| 2,356,827 A | 8/1944 | Coss |
| 2,439,602 A | 4/1948 | Heritage |
| 2,439,603 A | 4/1948 | Heritage |

(Continued)

FOREIGN PATENT DOCUMENTS

| | | |
|---|---|---|
| CA | 1320631 | 7/1993 |
| CA | 2259665 A1 | 1/1998 |

(Continued)

OTHER PUBLICATIONS

International Patent Application No. PCT/US2013036203, filing date: Apr. 11, 2013, Applicant: Whirlpool Corporation, International Search Report and Opinion mail date: Jul. 26, 2013.

(Continued)

*Primary Examiner* — Mohammad M Ali

(57) ABSTRACT

An appliance that includes a vacuum insulated cabinet structure having an exterior wall and an interior wall with a vacuum therebetween that forms at least the back wall, bottom, right side, left side, and top of the appliance; and a dual cooling system that includes at least one vapor compression system portion configured to operate during a pull down mode and a thermoelectric portion configured to operate in a steady-state mode without the vapor compression system operating while providing sufficient cooling to offset the steady-state heat load of the appliance.

19 Claims, 10 Drawing Sheets

(56) References Cited

U.S. PATENT DOCUMENTS

| | | | |
|---|---|---|---|
| 2,559,356 A | 7/1951 | Hedges | |
| 2,768,046 A | 10/1956 | Evans | |
| 2,817,123 A | 12/1957 | Jacobs | |
| 2,985,075 A | 5/1961 | Knutsson-Hall | |
| 3,125,388 A | 3/1964 | Costantini | |
| 3,137,900 A | 6/1964 | Carbary | |
| 3,258,883 A | 7/1966 | Goldstone | |
| 3,358,059 A | 12/1967 | Snyder | |
| 3,379,481 A | 4/1968 | Fisher | |
| 3,635,536 A | 1/1972 | Lackey | |
| 3,688,384 A | 9/1972 | Mizushima et al. | |
| 4,006,947 A | 2/1977 | Haag et al. | |
| 4,043,624 A | 8/1977 | Lindenschmidt | |
| 4,050,145 A | 9/1977 | Benford | |
| 4,067,628 A | 1/1978 | Sherburn | |
| 4,332,429 A | 6/1982 | Frick et al. | |
| 4,417,382 A | 11/1983 | Schilf | |
| 4,660,271 A | 4/1987 | Lenhardt | |
| 4,671,985 A | 6/1987 | Rodrigues et al. | |
| 4,764,193 A * | 8/1988 | Clawson | 62/3.3 |
| 4,805,293 A | 2/1989 | Buchser | |
| 4,917,841 A | 4/1990 | Jenkins | |
| 5,007,226 A | 4/1991 | Nelson | |
| 5,033,636 A | 7/1991 | Jenkins | |
| 5,082,335 A | 1/1992 | Cur et al. | |
| 5,175,975 A | 1/1993 | Benson et al. | |
| 5,221,136 A | 6/1993 | Hauck et al. | |
| 5,248,196 A | 9/1993 | Lynn et al. | |
| 5,252,408 A | 10/1993 | Bridges et al. | |
| 5,263,773 A | 11/1993 | Gable et al. | |
| 5,273,801 A | 12/1993 | Barry et al. | |
| 5,359,795 A | 11/1994 | Mawby et al. | |
| 5,507,999 A | 4/1996 | Copsey et al. | |
| 5,509,248 A | 4/1996 | Dellby et al. | |
| 5,512,345 A | 4/1996 | Tsutsumi et al. | |
| 5,586,680 A | 12/1996 | Dellby et al. | |
| 5,632,543 A | 5/1997 | McGrath et al. | |
| 5,640,828 A | 6/1997 | Reeves et al. | |
| 5,652,039 A | 7/1997 | Tremain et al. | |
| 5,715,684 A * | 2/1998 | Watanabe et al. | 62/3.2 |
| 5,716,581 A | 2/1998 | Tirrell et al. | |
| 5,827,385 A | 10/1998 | Meyer et al. | |
| 5,843,353 A | 12/1998 | DeVos et al. | |
| 5,866,228 A | 2/1999 | Awata et al. | |
| 5,900,299 A | 5/1999 | Wynne et al. | |
| 5,924,295 A | 7/1999 | Park | |
| 5,985,189 A | 11/1999 | Lynn et al. | |
| 6,109,712 A | 8/2000 | Haworth et al. | |
| 6,128,914 A | 10/2000 | Tamaoki et al. | |
| 6,132,837 A | 10/2000 | Boes et al. | |
| 6,158,233 A | 12/2000 | Cohen et al. | |
| 6,164,030 A | 12/2000 | Dietrich | |
| 6,220,473 B1 | 4/2001 | Lehman et al. | |
| 6,224,179 B1 | 5/2001 | Wenning et al. | |
| 6,260,377 B1 | 7/2001 | Yamaoki et al. | |
| 6,305,768 B1 | 10/2001 | Nishimoto | |
| 6,351,950 B1 * | 3/2002 | Duncan | 62/3.2 |
| 6,406,449 B1 | 6/2002 | Moore et al. | |
| 6,408,841 B1 | 6/2002 | Hirath et al. | |
| 6,415,623 B1 | 7/2002 | Jennings | |
| 6,460,955 B1 | 10/2002 | Vaughan et al. | |
| 6,623,413 B1 | 9/2003 | Wynne | |
| 6,773,082 B2 | 8/2004 | Lee | |
| 6,938,968 B2 | 9/2005 | Tanimoto et al. | |
| 7,210,308 B2 | 5/2007 | Tanimoto et al. | |
| 7,284,390 B2 | 10/2007 | Van Meter et al. | |
| 7,296,432 B2 | 11/2007 | Muller et al. | |
| 7,316,125 B2 | 1/2008 | Uekado et al. | |
| 7,343,757 B2 | 3/2008 | Egan et al. | |
| 7,641,298 B2 | 1/2010 | Hirath et al. | |
| 7,762,634 B2 | 7/2010 | Tenra et al. | |
| 7,815,269 B2 | 10/2010 | Wenning et al. | |
| 7,861,538 B2 | 1/2011 | Welle et al. | |
| 7,886,559 B2 | 2/2011 | Hell et al. | |
| 7,908,873 B1 | 3/2011 | Cur et al. | |
| 7,930,892 B1 | 4/2011 | Vonderhaar | |
| 8,113,604 B2 | 2/2012 | Olson et al. | |
| 8,117,865 B2 | 2/2012 | Allard et al. | |
| 8,281,558 B2 | 10/2012 | Hiemeyer et al. | |
| 8,353,177 B2 | 1/2013 | Adamski et al. | |
| 2002/0168496 A1 | 11/2002 | Morimoto et al. | |
| 2003/0008100 A1 | 1/2003 | Horn | |
| 2004/0025515 A1 * | 2/2004 | Evans | 62/3.2 |
| 2004/0035142 A1 * | 2/2004 | Yoon et al. | 62/441 |
| 2004/0118141 A1 * | 6/2004 | Kim et al. | 62/258 |
| 2004/0178707 A1 | 9/2004 | Avendano et al. | |
| 2004/0180176 A1 | 9/2004 | Rusek | |
| 2004/0253406 A1 | 12/2004 | Hayashi et al. | |
| 2005/0034477 A1 * | 2/2005 | Hu | 62/435 |
| 2005/0235682 A1 | 10/2005 | Hirai et al. | |
| 2006/0010890 A1 * | 1/2006 | Feinauer et al. | 62/169 |
| 2006/0076863 A1 | 4/2006 | Echigoya et al. | |
| 2006/0088685 A1 * | 4/2006 | Echigoya et al. | 428/69 |
| 2006/0144073 A1 * | 7/2006 | Lee et al. | 62/333 |
| 2006/0188418 A1 * | 8/2006 | Park et al. | 422/292 |
| 2006/0201189 A1 | 9/2006 | Adamski et al. | |
| 2006/0263571 A1 | 11/2006 | Tsunetsugu et al. | |
| 2007/0001563 A1 | 1/2007 | Park et al. | |
| 2007/0099502 A1 | 5/2007 | Ferinauer et al. | |
| 2007/0101737 A1 * | 5/2007 | Akei et al. | 62/238.6 |
| 2007/0101750 A1 * | 5/2007 | Pham et al. | 62/332 |
| 2007/0180839 A1 * | 8/2007 | Kim | 62/178 |
| 2008/0000242 A1 * | 1/2008 | Jung | 62/159 |
| 2008/0156034 A1 * | 7/2008 | Cur et al. | 62/449 |
| 2008/0309210 A1 | 12/2008 | Luisi et al. | |
| 2009/0056367 A1 | 3/2009 | Neumann | |
| 2009/0058244 A1 | 3/2009 | Cho et al. | |
| 2009/0100842 A1 * | 4/2009 | Tsai et al. | 62/3.3 |
| 2009/0113925 A1 | 5/2009 | Korkmaz | |
| 2009/0179541 A1 | 7/2009 | Smith et al. | |
| 2009/0324871 A1 | 12/2009 | Henn | |
| 2010/0071384 A1 * | 3/2010 | Lu et al. | 62/3.2 |
| 2010/0126185 A1 * | 5/2010 | Cho et al. | 62/3.63 |
| 2010/0293984 A1 | 11/2010 | Adamski et al. | |
| 2010/0295435 A1 | 11/2010 | Kendall et al. | |
| 2011/0030894 A1 | 2/2011 | Tenra et al. | |
| 2011/0146335 A1 | 6/2011 | Jung et al. | |
| 2011/0165367 A1 | 7/2011 | Kojima et al. | |
| 2011/0241513 A1 | 10/2011 | Nomura et al. | |
| 2011/0241514 A1 | 10/2011 | Nomura et al. | |
| 2011/0260351 A1 | 10/2011 | Corradi | |
| 2011/0290808 A1 | 12/2011 | Lei et al. | |
| 2011/0315693 A1 | 12/2011 | Cur et al. | |
| 2012/0000234 A1 | 1/2012 | Adamski et al. | |
| 2012/103006 A1 | 5/2012 | Jung et al. | |
| 2012/0104923 A1 | 5/2012 | Jung et al. | |
| 2012/0118002 A1 * | 5/2012 | Kim et al. | 62/440 |
| 2012/0137501 A1 | 6/2012 | Allard et al. | |
| 2012/0231204 A1 | 9/2012 | Jeon et al. | |
| 2012/0237715 A1 | 9/2012 | McCracken | |
| 2012/0273111 A1 | 11/2012 | Nomura et al. | |
| 2012/0279247 A1 | 11/2012 | Katu et al. | |
| 2012/0297813 A1 | 11/2012 | Hanley et al. | |
| 2012/0324937 A1 | 12/2012 | Adamski et al. | |
| 2013/0255304 A1 | 10/2013 | Cur et al. | |
| 2013/0256318 A1 | 10/2013 | Kuehl et al. | |
| 2013/0256319 A1 | 10/2013 | Kuehl et al. | |
| 2013/0257256 A1 | 10/2013 | Allard et al. | |
| 2013/0257257 A1 | 10/2013 | Cur et al. | |
| 2013/0270732 A1 | 10/2013 | Wu et al. | |
| 2013/0305535 A1 | 11/2013 | Cur et al. | |
| 2014/0260332 A1 | 9/2014 | Wu | |

FOREIGN PATENT DOCUMENTS

| | | |
|---|---|---|
| CN | 1707204 A | 12/2005 |
| CN | 201680116 U | 12/2010 |
| CN | 102452522 A | 5/2012 |
| DE | 19818890 A1 | 11/1999 |
| DE | 102010024951 A1 | 12/2011 |
| EP | 1087186 A2 | 3/2001 |
| EP | 1200785 A1 | 5/2002 |
| EP | 1243880 A1 | 9/2002 |
| EP | 1496322 A1 | 1/2005 |

(56) References Cited

FOREIGN PATENT DOCUMENTS

| | | |
|---|---|---|
| EP | 1505359 A1 | 9/2005 |
| EP | 2342511 B1 | 8/2012 |
| FR | 2980963 A1 | 10/2011 |
| GB | 837929 | 6/1960 |
| GB | 1214548 | 12/1970 |
| JP | 59191588 U | 6/1983 |
| JP | 403013779 A | 1/1991 |
| JP | 06159922 A | 6/1994 |
| JP | 7001479 A | 1/1995 |
| JP | 10113983 A | 5/1998 |
| JP | 11336990 A | 12/1999 |
| JP | 2000097390 A | 4/2000 |
| JP | 2000117334 A | 4/2000 |
| JP | 2001165557 A | 6/2001 |
| JP | 2001343176 A | 12/2001 |
| JP | 2004303695 A | 10/2004 |
| JP | 2005164193 A | 6/2005 |
| JP | 2007263186 A | 10/2007 |
| JP | 2008049798 A | 3/2008 |
| JP | 2008064323 A | 3/2008 |
| JP | 2010108199 A | 10/2008 |
| JP | 2009162402 A | 7/2009 |
| JP | 2010017437 A | 1/2010 |
| JP | 2010074484 A | 4/2010 |
| JP | 2010145002 A | 7/2010 |
| JP | 20102367770 A | 10/2010 |
| JP | 2010276309 A | 12/2010 |
| JP | 2011002033 A | 1/2011 |
| JP | 2012163258 A | 2/2011 |
| JP | 2011196644 A | 10/2011 |
| JP | 2013050242 A | 10/2011 |
| JP | 2013088036 A | 10/2011 |
| JP | 2012026493 A | 2/2012 |
| JP | 04897473 B2 | 3/2012 |
| JP | 2012063029 A | 3/2012 |
| JP | 2012087993 A | 5/2012 |
| JP | 2012242075 A | 12/2012 |
| KR | 20020057547 A | 7/2002 |
| KR | 2004000126 A | 1/2004 |
| KR | 1020070051092 A | 11/2008 |
| KR | 20120007241 A | 7/2010 |
| KR | 2012046621 A | 5/2012 |
| KR | 2012051305 A | 5/2012 |
| WO | 8302904 A1 | 9/1983 |
| WO | 2010029730 A1 | 3/2010 |
| WO | 2010043009 A2 | 4/2010 |
| WO | 2010092627 A1 | 8/2010 |
| WO | 2011003711 A2 | 1/2011 |
| WO | 2011081498 A2 | 7/2011 |
| WO | 2012026715 A2 | 1/2012 |
| WO | 2012023705 A2 | 2/2012 |

OTHER PUBLICATIONS

European Patent Application No. 14158608.1 filed Mar. 10, 2014, Applicant: Whirlpool Corporation, European Search re: same, mail date: Oct. 14, 2014.

\* cited by examiner

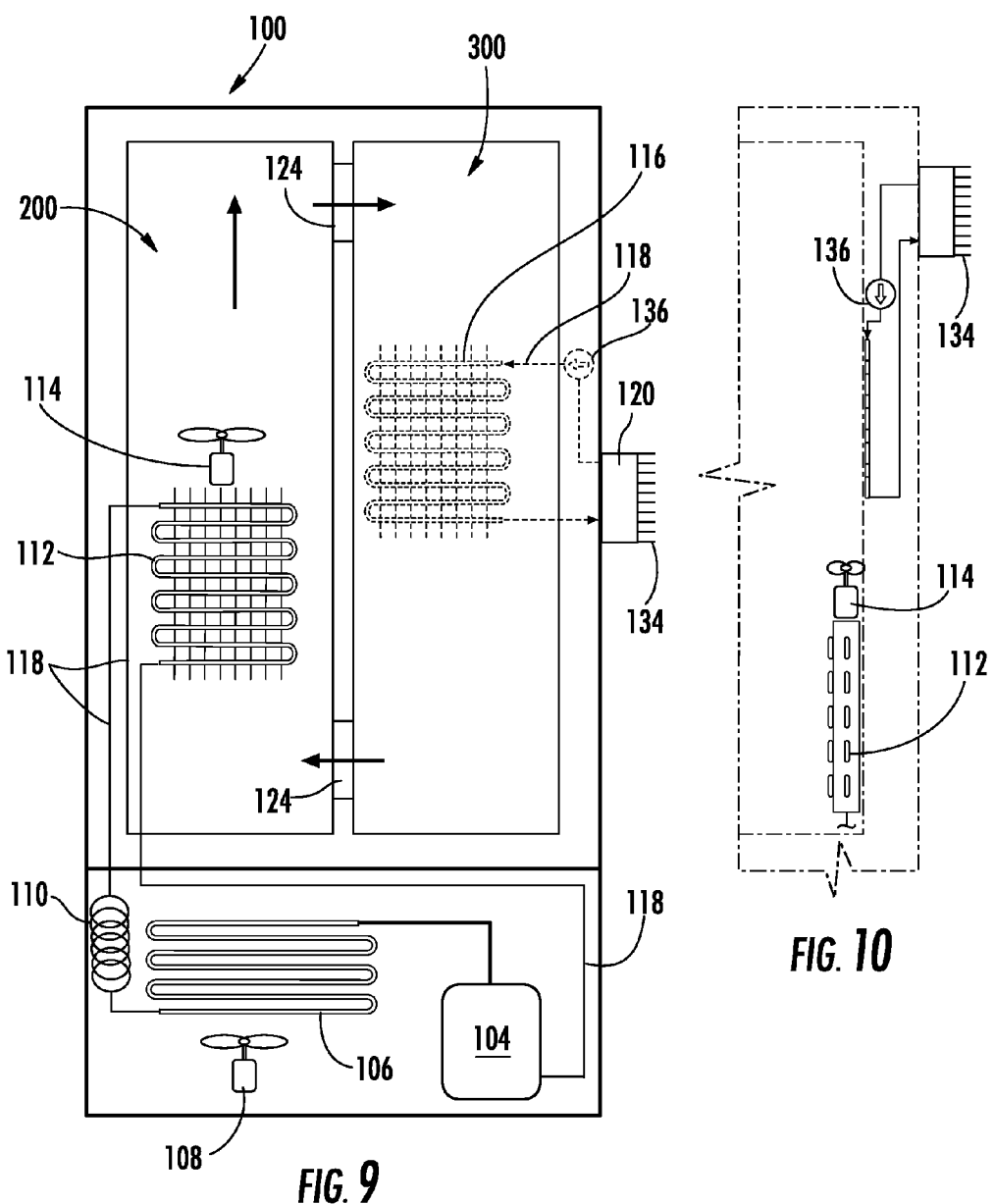

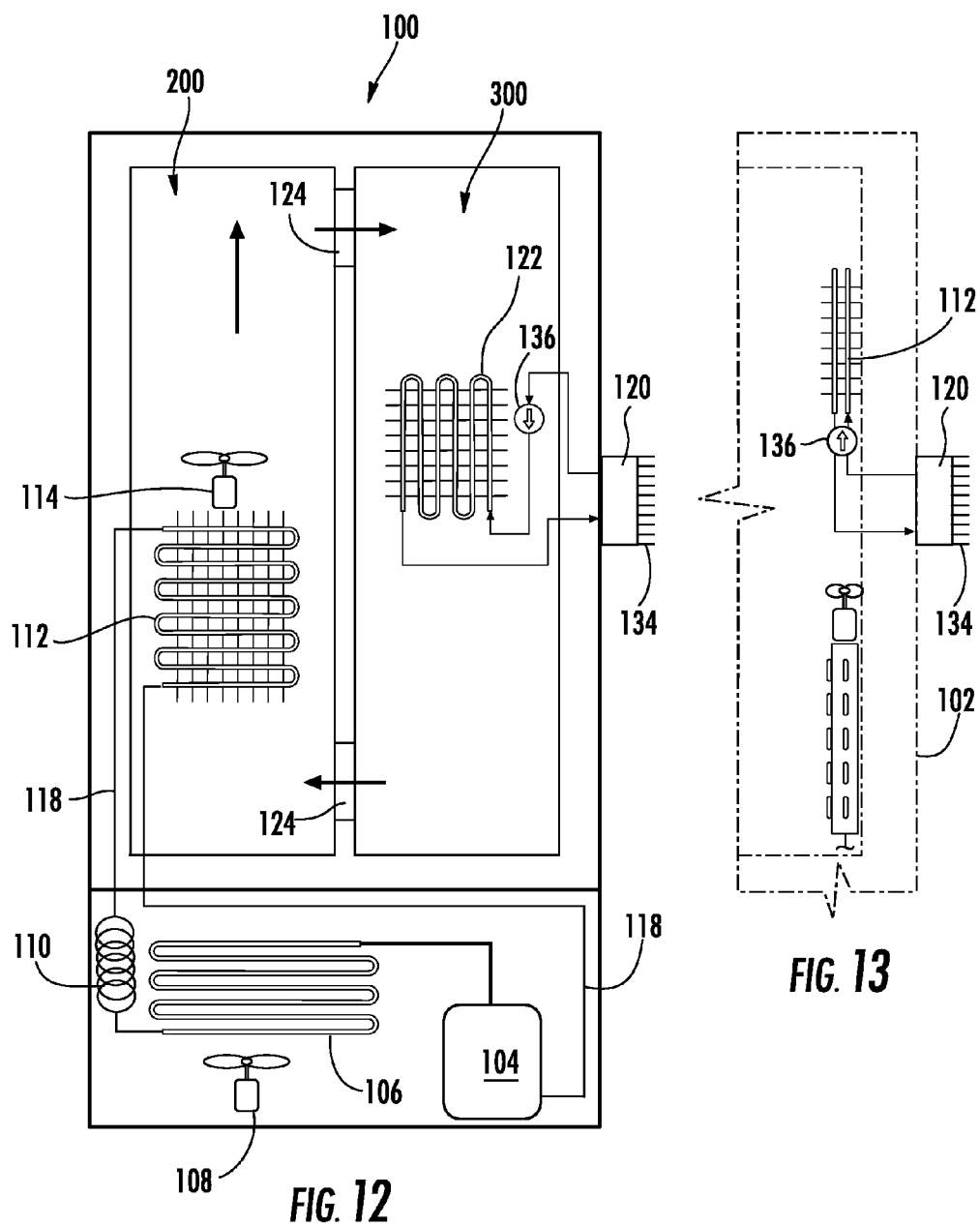

DUAL COOLING SYSTEMS TO MINIMIZE OFF-CYCLE MIGRATION LOSS IN REFRIGERATORS WITH A VACUUM INSULATED STRUCTURE

CROSS-REFERENCE TO RELATED APPLICATIONS

The present application is related to U.S. patent application Ser. No. 13/833,635, filed Mar. 15, 2013, entitled A METHOD TO CREATE VACUUM INSULATED CABINETS FOR REFRIGERATORS; and U.S. patent application Ser. No. 13/836,669, filed Mar. 15, 2013, entitled FOLDED VACUUM INSULATED STRUCTURE; and U.S. patent application Ser. No. 13/836,449, filed Mar. 15, 2013, entitled A VACUUM PANEL CABINET STRUCTURE FOR A REFRIGERATOR; and U.S. patent application Ser. No. 13/832,246, filed Mar. 15, 2013, entitled DUAL COOLING SYSTEMS TO MINIMIZE OFF-CYCLE MIGRATION LOSS IN REFRIGERATORS WITH A VACUUM INSULATED STRUCTURE; and U.S. patent application Ser. No. 13/833,636 filed Mar. 15, 2013, entitled VACUUM INSULATED DOOR STRUCTURE AND METHOD FOR THE CREATION THEREOF; and U.S. patent application Ser. No. 13/836,143, filed Mar. 15, 2013,entitled VACUUM INSULATED STRUCTURE TUBULAR CABINET CONSTRUCTION; and U.S. patent application Ser. No. 13/837,659, filed Mar. 15, 2013, entitled FOLDED VACUUM INSULATED STRUCTURE; and U.S. patent application Ser. No. 13/833,685, filed Mar. 15, 2013, entitled METHOD TO CREATE VACUUM INSULATED CABINETS FOR REFRIGERATORS, all of which are incorporated herein by reference in their entirety.

BRIEF SUMMARY OF THE PRESENT INVENTION

One aspect of the present invention generally includes an appliance having: a vacuum insulated cabinet structure having an exterior wall and an interior wall with a vacuum therebetween that forms at least the back wall, bottom, right side, left side, and top of the appliance; and a dual cooling system that includes at least one vapor compression system portion configured to operate during a pull down mode and a thermoelectric portion configured to operate in a steady-state mode without the vapor compression system operating while providing sufficient cooling to offset the steady-state heat load of the appliance.

Another aspect of the present invention generally includes an appliance having: a vacuum insulated cabinet structure having an exterior wall and an interior wall with a vacuum therebetween that forms at least the back wall, bottom, right side, left side, and top of the appliance; and a dual cooling system that includes at least one vapor compression system portion configured to operate during a pull down mode and a thermoelectric portion that includes a thermoelectric device positioned outside the vacuum insulated cabinet structure and a coolant loop operably connected to a coolant tubing positioned between the interior wall and the exterior wall in thermal communication with a refrigerator compartment or a heat exchanger positioned within the refrigerator compartment of the vacuum insulated cabinet structure. The thermoelectric cooling portion is configured to operate in a steady-state mode without the vapor compression system operating while providing sufficient cooling to offset the steady-state heat load of the refrigerator compartment of the appliance.

Yet another aspect of the present invention generally includes a method of cooling an appliance having a pull down mode and a steady-state mode that includes at least the steps of: using a vapor compression circuit that includes a compressor, a condenser, a throttling device, and an evaporator or vapor compression circuit coolant tubing during a pull down mode to provide convective cooling to an interior volume of the appliance wherein the appliance is constructed of a vacuum insulated cabinet and at least one vacuum insulated door to enclose the interior volume of the appliance; and using a thermoelectric cooling circuit including a thermoelectric device fluidly connected by coolant conduits to heat exchanger or thermoelectric cooling circuit coolant tubing during a steady-state mode to provide convective cooling to an interior volume of the appliance.

Another aspect of the present invention is generally directed to a method of cooling an appliance having a pull down mode and a steady-state mode that includes at least the steps of: cooling an interior of an appliance, typically a refrigerator compartment of an appliance using a vapor compression circuit that includes a compressor, a condenser, a throttling device, and an evaporator or vapor compression circuit coolant tubing during a pull down mode where the appliance is constructed of a vacuum insulated cabinet and typically also at least one vacuum insulated door to enclose the interior volume of the appliance; and cooling an interior of an appliance, typically a refrigerator compartment, using a thermoelectric cooling circuit that includes a thermoelectric device fluidly connected by coolant conduits to an evaporator or thermoelectric cooling circuit coolant tubing during a steady-state mode to provide convective cooling to an interior volume of the appliance.

These and other features, advantages, and objects of the present invention will be further understood and appreciated by those skilled in the art by reference to the following specification, claims, and appended drawings.

BRIEF DESCRIPTION OF THE DRAWING

FIG. 9 is a front schematic view of a dual cooling system;

FIG. 10 is a side schematic view of the dual cooling system of FIG. 9;

FIG. 12 is a front schematic view of a dual cooling system;

FIG. 13 is a side schematic view of the dual cooling system of FIG. 12; and

DETAILED DESCRIPTION

Figure 6:
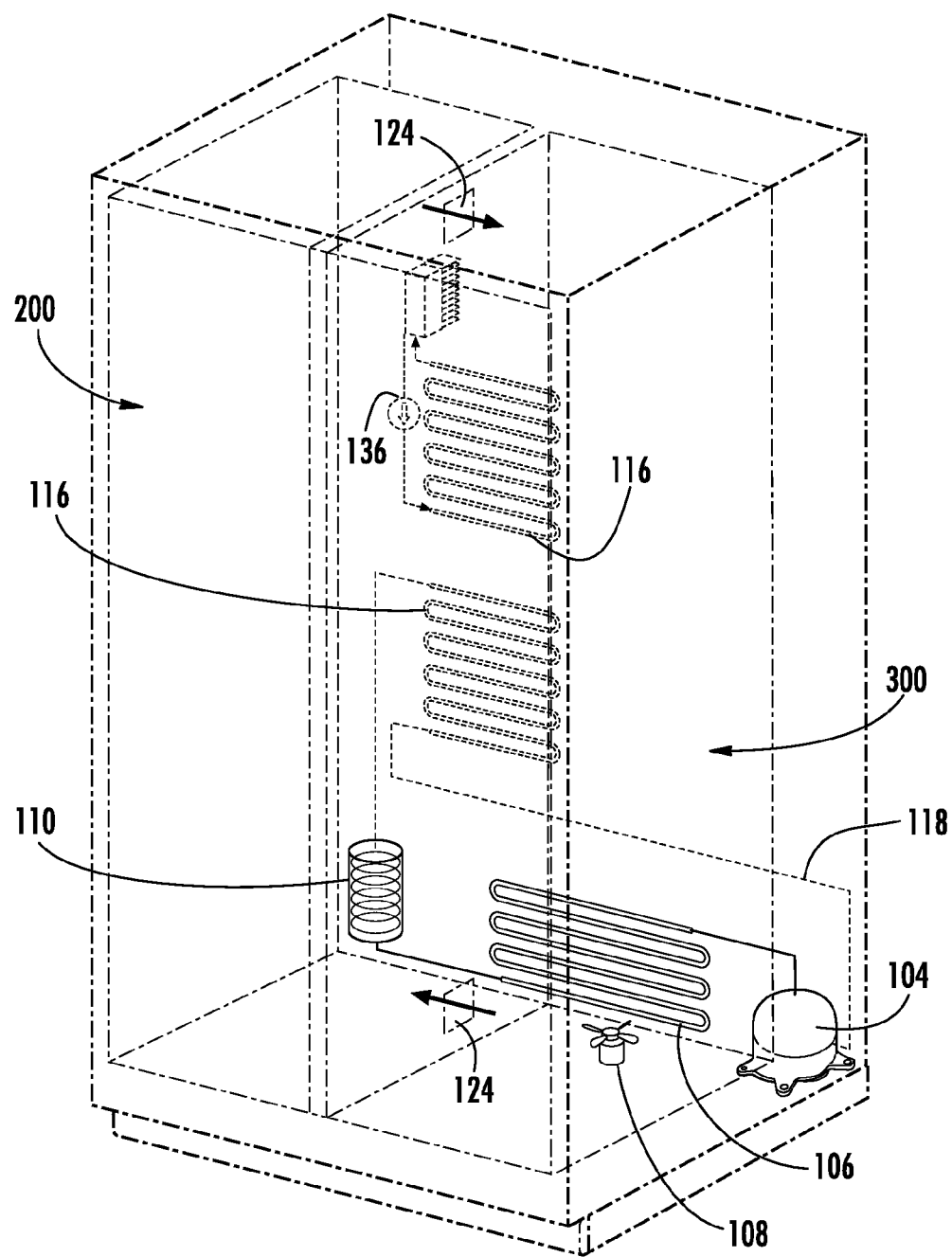
FIG. 6 is a perspective view of the dual cooling system shown in FIG. 4.

For purposes of description herein, the terms "upper," "lower," "right," "left," "rear," "front," "vertical," "horizontal," and derivatives thereof shall relate to the invention as oriented in FIG. 6. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Before the subject invention is described further, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention. In this specification and the appended claims, the singular forms "a," "an" and "the" include plural reference unless the context clearly dictates otherwise.

Figure 1:
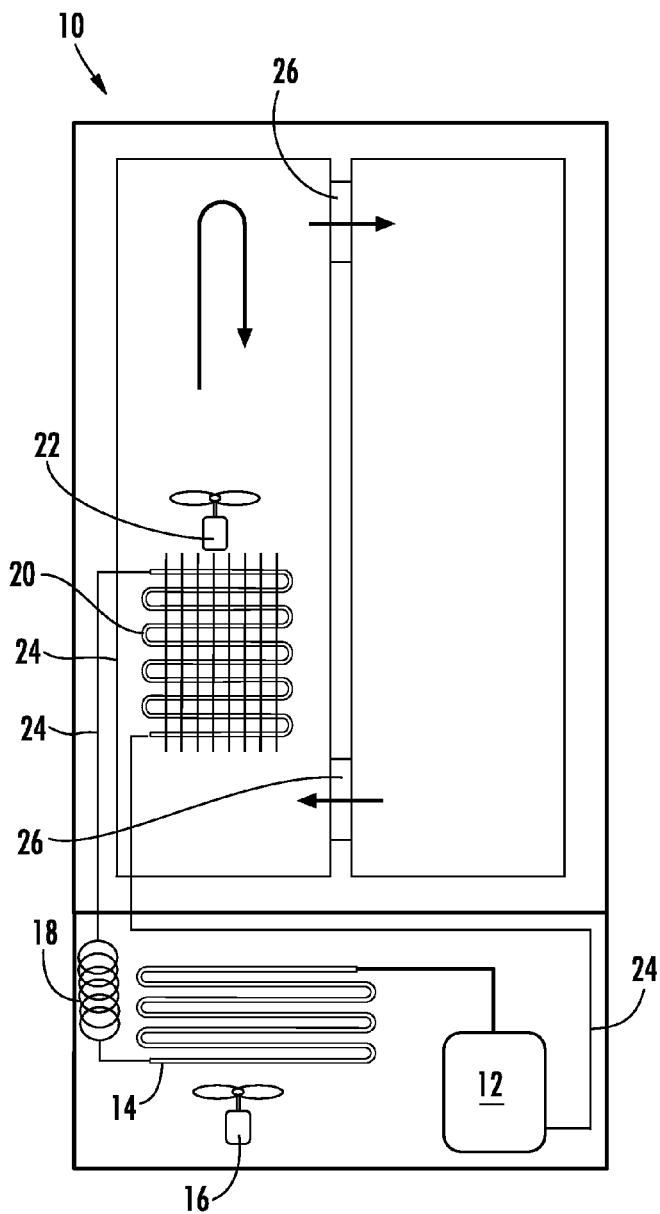
FIG. 1 is a front schematic view of a prior art vapor compression system in a side by side refrigerator freezer.
Figure 2:
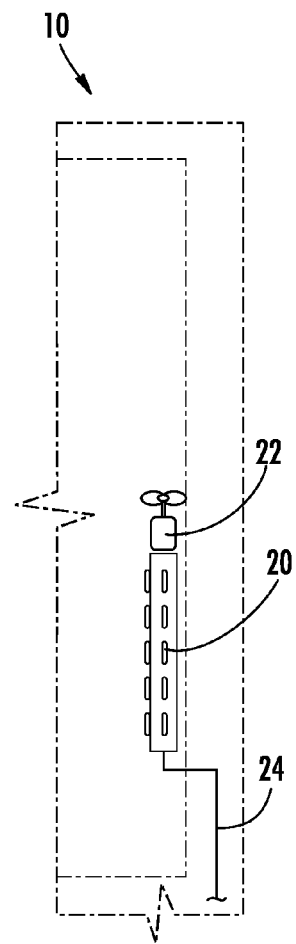
FIG. 2 is a side schematic view of the prior art vapor compression system of FIG. 1.
Figure 3:
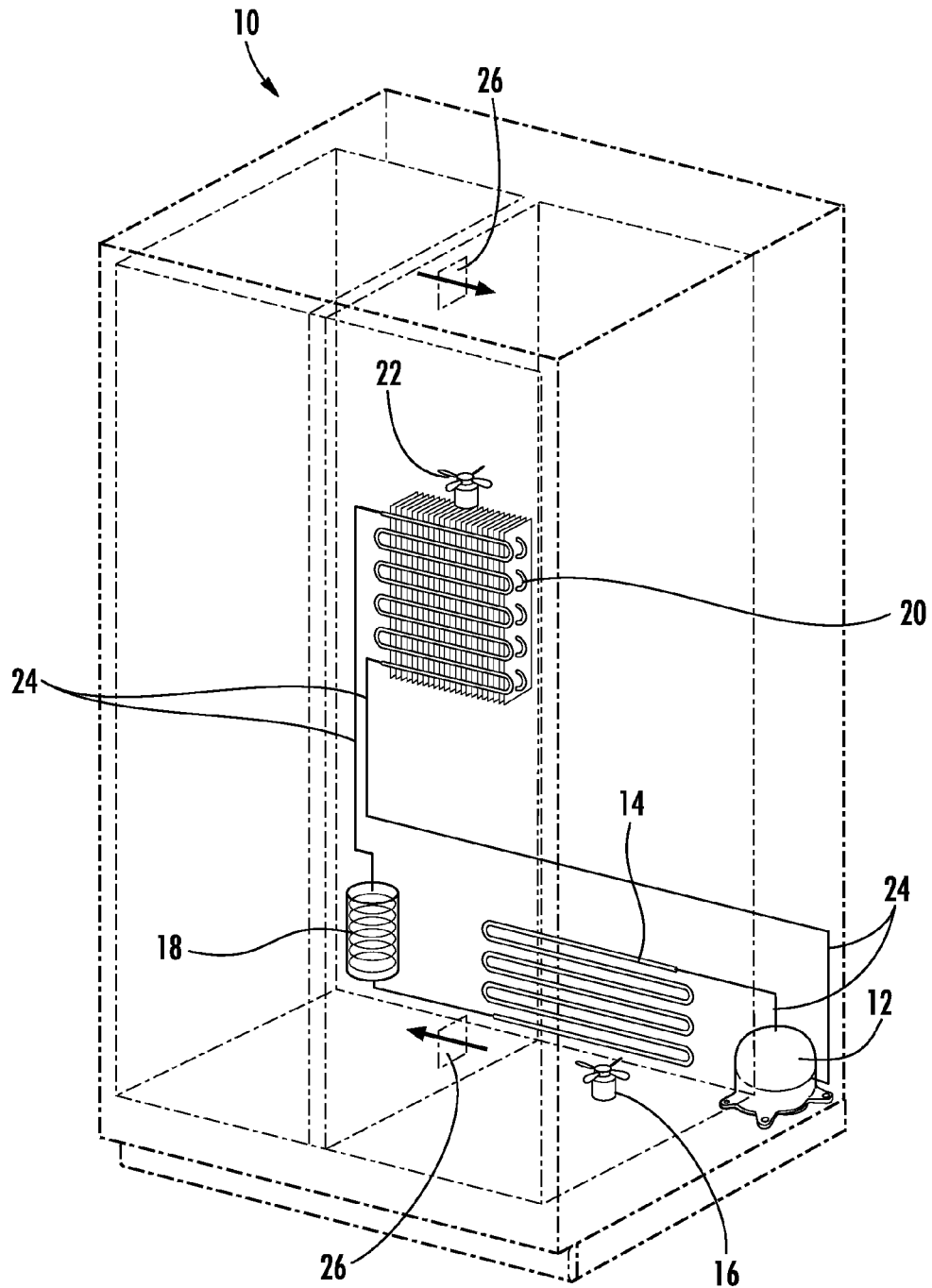
FIG. 3 is a perspective view of the prior art vapor compression system of FIG. 1.

As shown in FIGS. 1-3, current refrigerators and/or freezers 10 typically incorporate a vapor compression system incorporating a compressor 12, condenser 14, a condenser fan 16, a throttling device 18, an evaporator 20 and an evaporator fan 22 all fluidly interconnected with coolant fluid conduits 24 to provide cooling to the appliance. Such appliances do not typically have a vacuum insulated cabinet structure let alone a dual cooling system of the present invention. The systems may use one or more dampers 26 to regulate cooling flow between the compartments such as shown in FIGS. 1-3. In such systems the compressors typically run only about 60% of the time causing frequent on and off operations that increase the energy consumption due to on-off cycle refrigerant migration loss.

The present invention is generally directed to an appliance 100 that may be a refrigerator, freezer, or refrigerator and freezer that has a vacuum insulated cabinet structure 102 and incorporates a dual cooling system. The appliance my be any orientation such as a side by side, a French door bottom mount freezer, a top mount freezer, a bottom mount freezer, or a refrigerator appliance alone, for example. The configuration of the appliance is not critical and the dual cooling systems of the present invention are presently believed to be adaptable to any of a variety of cabinet configuration so long as the cabinet is a vacuum insulation structure with higher insulation capacity than traditional foam insulated cabinets. The dual cooling systems of the present invention generally incorporate both a vapor compression system and a cooling system using a thermoelectric device. The vapor compression system typically contains a compressor 104, condenser 106, a condenser fan 108, a throttling device 110, an evaporator 112 and an evaporator fan 114 (when not positioned within the housing of the vacuum insulated cabinet) or coolant tubing 116 (when positioned within the cabinet structure) all fluidly interconnected with coolant fluid conduits 118 to provide cooling to the appliance. When coolant tubing 116 is used and spaced within the cabinet structure the tubing is generally positioned proximate to or physically engaged to or in thermal engagement with the liner of the appliance 100 to maximize convection cooling from the vapor compression system and the thermoelectric cooling system. The thermoelectric cooling systems of the present invention typically incorporates a thermoelectric device 120 fluidly connected by fluid conduits 118 to a heat exchanger 122 (when outside the cabinet) or coolant tubing 116 (when positioned within the cabinet structure) to provide cooling to the appliance interior. Previously such systems were not practical to use to cool an entire cabinet, but the use of entire vacuum insulation systems in connection with the dual cooling systems of the present invention allows for the thermoelectric cooling portion of the dual cooling systems to be sufficient to supply enough cooling to offset the steady-state heat load and maintain the refrigerator cabinet temperatures around their user selected set points.

The vapor compression system portion of the dual cooling systems of the present invention are used for fast recovery. The vapor compression system is typically used for fast recovery scenarios such as when the refrigerator is freshly loaded or newly placed into condition or after a power loss. The thermoelectric portion of the dual cooling system provides the cooling capacity to operate almost 100% of the time or 100% of the time and provides other benefits such as significant reduction in noise over standard refrigerators incorporating vapor compression systems to supply more cooling capacity other than fast recovery situations.

The thermoelectric device 120 may be positioned within the cabinet structure is a standard thermoelectric device that operates by the Peltier effect (the thermoelectric effect). These devices have two sides and when a current flows through the device, it brings heat from one side to the other so that the one side gets cooler when the other gets hotter. The cool side provides the cooling capacity for use in connection with the present invention and the hot side is attached to a heat sink so that it remains at ambient temperature. The device 120 may be used in a cascading manner with one or more additional thermoelectric devices or may be cascaded with a vapor compression system, either the one present to provide supplemental fast recovery cooling or a separate vapor compression system.

The present dual cooling systems used within a vacuum insulated structure of an appliance allows for the thermoelectric portion of the dual cooling system from about 95% to about 100% of the time. This provides efficiencies and reduced sound benefits to the appliance.

Figure 4:
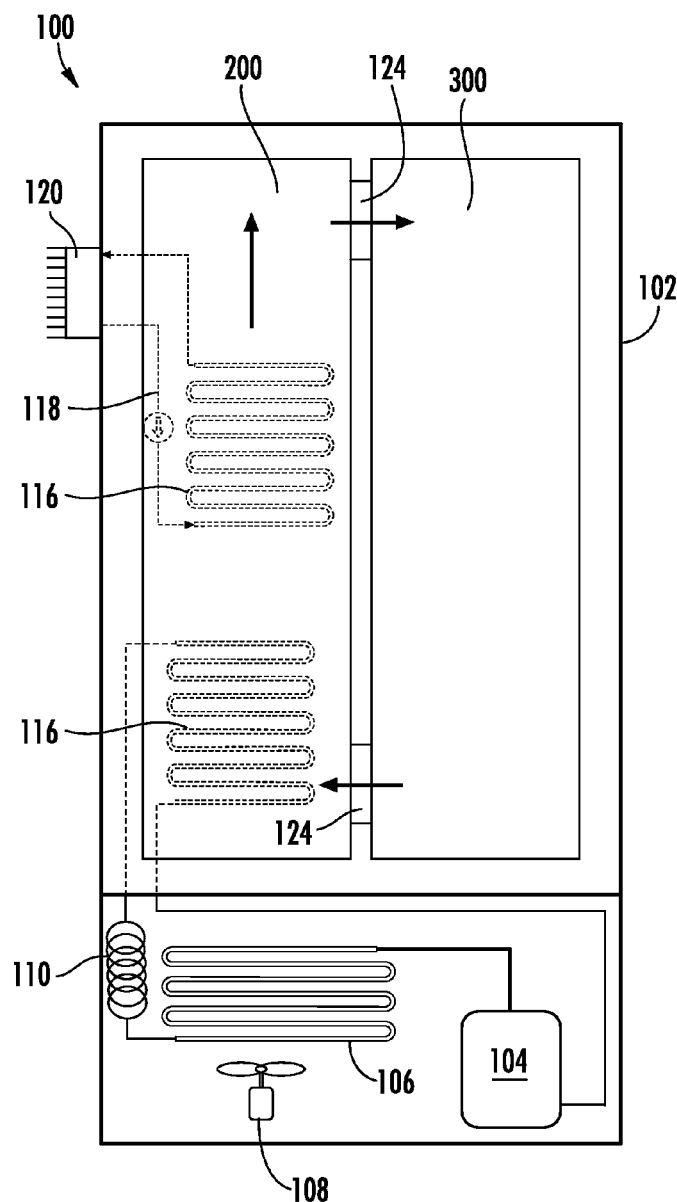
FIG. 4 is a front schematic view of a dual cooling system.
Figure 5:
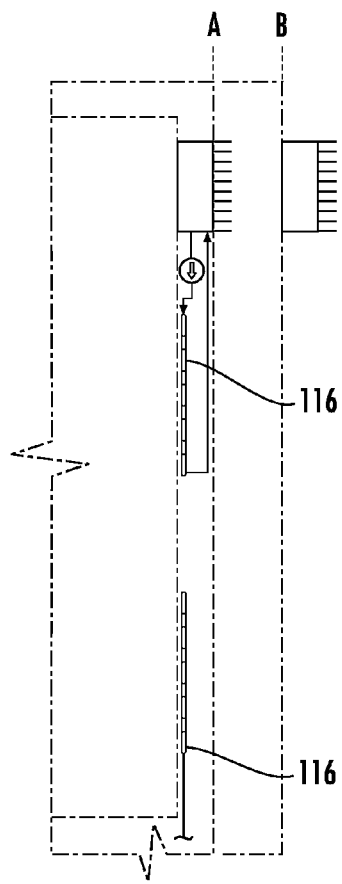
FIG. 5 is a side perspective view of the dual cooling system shown in FIG. 4.
Figures 7A, 8:
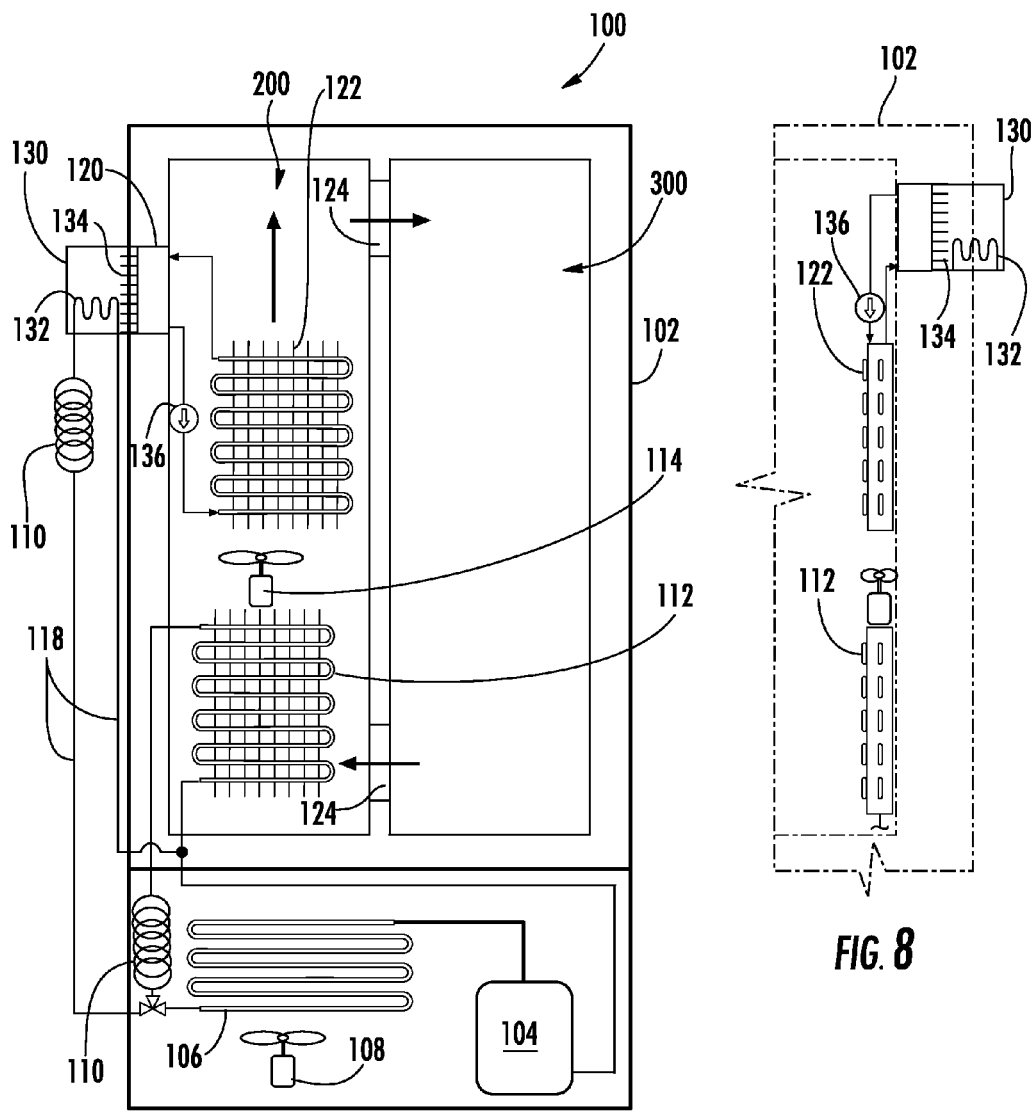
FIG. 7A is a front schematic view of a dual cooling system incorporating an optional thermal bank.
FIG. 8 is a side perspective view of the dual cooling system shown in FIG. 7A.
Figure 7B:
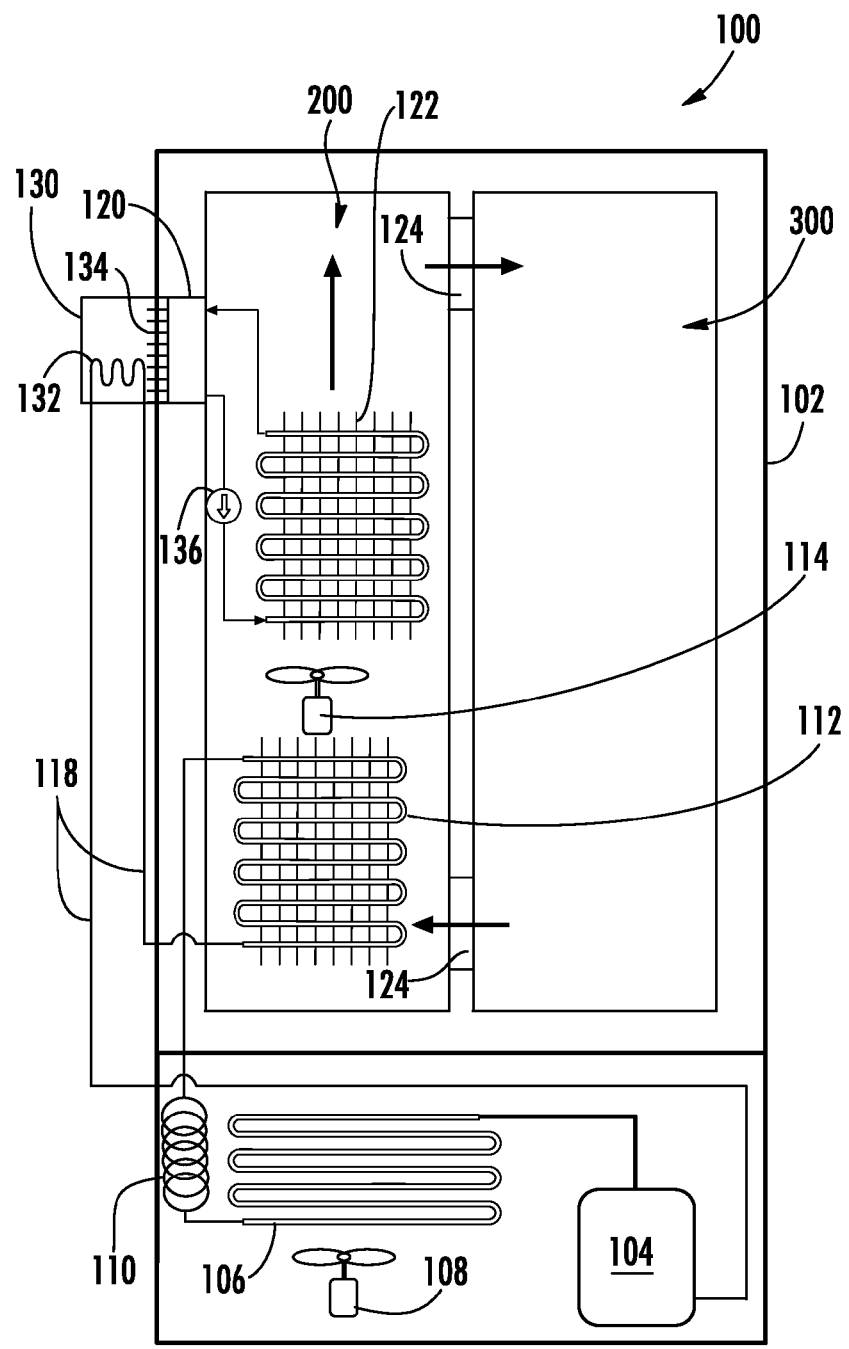
FIG. 7B is a front schematic view of a dual cooling system incorporating an optional thermal bank.
Figure 11:
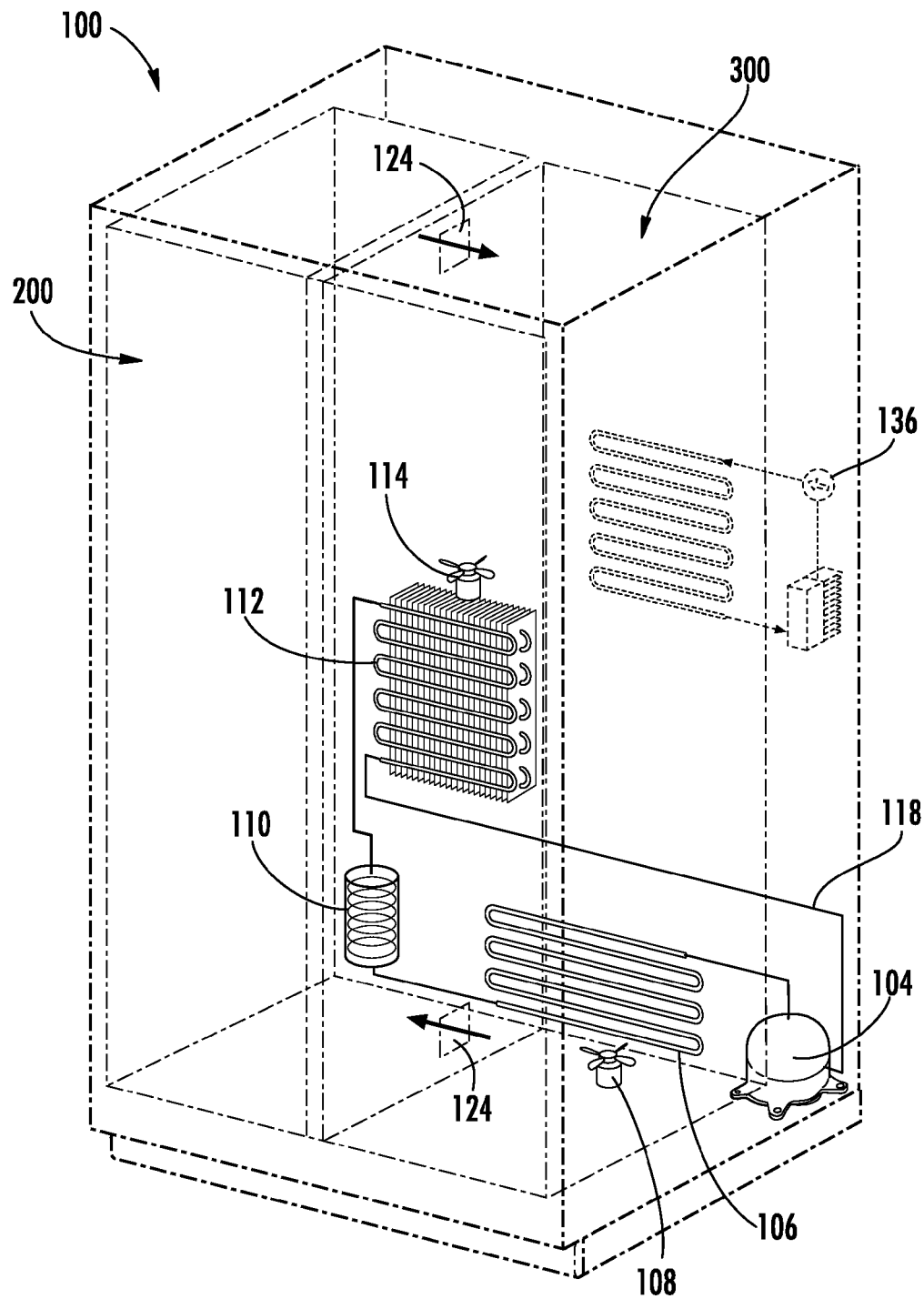
FIG. 11 is a perspective view of the dual cooling system of FIG. 9.
Figure 14:
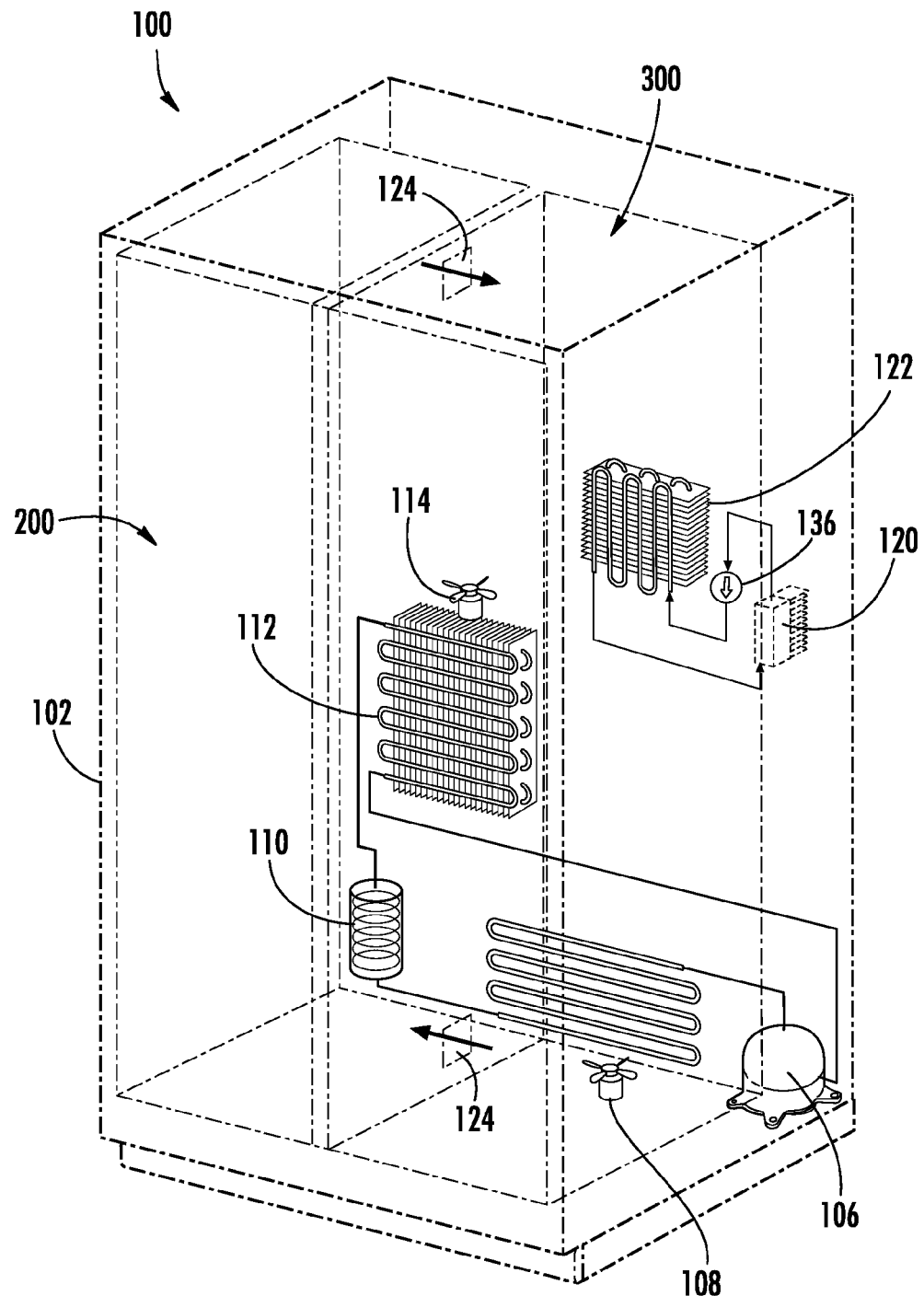
FIG. 14 is a perspective view of the dual cooling system of FIG. 12.

As shown in FIGS. 4-6, the thermoelectric tubing and the vapor compression tubing may be placed within the structure adjacent the liner of the freezer as shown or, as shown in FIGS. 7-8, the heat exchanger of the thermoelectric portion and the evaporator may be spaced within the cabinet interior. Of course, while not shown, the system may also have the thermoelectric tubing in the cabinet structure and the vapor compression portion's evaporator may be within the cabinet interior or the vapor compression cooling tubing may be positioned within the cabinet structure and the thermoelectric heat exchanger may be positioned within the cabinet interior.

As shown in FIGS. 7-9, the system would typically use a thermal bank to provide sufficient cooling capacity to the thermoelectric portion when it is used in connection with the freezer compartment 200. The thermal bank may be used when the thermoelectric portion is used in connection with the refrigerator compartment 300 (See FIGS. 9-14). The thermal bank may be any phase change material. United States Patent Application Publication No. US 2011/0011119 entitled "High Efficiency Refrigerator" filed on Jul. 15, 2009 is hereby incorporated by reference in its entirety.

As shown in FIG. 5, the figure shows how the thermal bank may be positioned entirely within the cabinet (within line B), partially within the vacuum insulated cabinet structure and partially outside the cabinet, or entirely positioned outside the cabinet structure (outside line A). Typically, the heat sink portion with the fins of the thermoelectric will be positioned facing away from the appliance to optimize the efficiency of the thermoelectric portion of the dual cooling systems of the present invention.

As shown in FIGS. 9-14, the thermoelectric portion is more typically positioned in thermal connection with the refrigeration compartment 300. In such situations the thermal bank is not typically employed, but may optionally be used. as before, the thermoelectric portion's tubing (when positioned within the cabinet structure) or heat exchanger (when positioned within the interior volume of the cabinet) provide the majority, more typically from about 95-100%, and most typically about 100% of the steady-state cooling to the overall appliance, in particular to the refrigerator compartment. As with the other embodiments of the present invention, cooling may be distributed and regulated across the compartments by opening or closing dampers 124.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

The invention claimed is:

1. An appliance comprising:
a vacuum insulated cabinet structure having an exterior wall and an interior wall with a vacuum therebetween that forms at least a back wall, bottom, right side, left side, and top of the appliance; and
a dual cooling system that comprises at least one vapor compression system portion configured to operate during a pull down mode and a thermoelectric portion configured to operate in a steady-state mode without the vapor compression system operating while providing sufficient cooling to offset the steady-state heat load of the appliance;
wherein the thermoelectric portion of the dual cooling system comprises a thermoelectric device positioned outside the appliance cabinet and fluid conduits fluidly connecting the thermoelectric device to either a thermoelectric portion cooling tubing section positioned to provide cooling via convective cooling to the appliance interior or a thermoelectric portion heat exchanger positioned within the interior volume of the appliance.

2. The appliance of claim 1, wherein the vapor compression system portion comprises a compressor, a condenser, a throttling device, and an evaporator positioned within an interior volume of the vacuum insulated cabinet structure and a plurality of coolant fluid conduits that fluidly interconnect the components of the vapor compression system portion and wherein the thermoelectric portion is positioned in thermal communication within a freezer compartment of the appliance.

3. The appliance of claim 2, wherein the compressor and condenser are both positioned within a machine compartment of the appliance and the thermoelectric device is positioned on the exterior of the appliance and in thermal communication with the freezer compartment through use of a heat exchanger positioned within the interior volume of the appliance or tubing in thermal communication with the interior wall and wherein the thermoelectric device is in thermal communication with a thermal bank that is cooled using the vapor compression system portion.

4. The appliance of claim 1, wherein the vapor compression system portion comprises a compressor, a condenser, a throttling device, and an evaporator positioned within an interior volume of the vacuum insulated cabinet structure and a plurality of coolant fluid conduits that fluidly interconnect the components of the vapor compression system portion and wherein the thermoelectric portion is positioned in thermal communication with a refrigerator compartment of the appliance.

5. The appliance of claim 4, wherein the pull down mode comprises a mode where the appliance is not in a steady-state condition and the thermoelectric device operates in the steady-state mode and the pull down mode.

6. The appliance of claim 5, wherein the pull down mode includes when the appliance interior is freshly loaded with contents or when the appliance is placed in operation after a period of non-use.

7. The appliance of claim 1, wherein the thermoelectric portion of the dual cooling system comprises a thermoelectric device positioned outside the appliance cabinet and fluid conduits fluidly connect the thermoelectric device to a thermoelectric portion cooling tubing section engaged to the interior wall of the appliance and between the interior wall and the exterior wall to provide cooling via convective cooling to the appliance interior.

8. The appliance of claim 7, wherein the thermoelectric portion of the dual cooling system consists of a thermoelectric device positioned outside the appliance cabinet and engaged to an outside facing surface of the appliance and fluid conduits fluidly connecting the thermoelectric device and the thermoelectric portion cooling tubing section.

9. The appliance of claim 1, wherein the vapor compression system portion only operates in a pull down mode and the thermoelectric device constantly operates in a steady-state mode.

10. The appliance of claim 1, wherein the vapor compression system portion only operates after the interior of the appliance has been opened to an ambient, after a power outage, or upon initial startup of the appliance.

11. The appliance of claim 10, wherein the thermoelectric portion operates substantially constantly.

12. The appliance of claim 11, wherein the thermoelectric portion operates constantly.

13. An appliance comprising:
a vacuum insulated cabinet structure having an exterior wall and an interior wall with a vacuum therebetween that forms at least a back wall, bottom, right side, left side, and top of the appliance; and
a dual cooling system that comprises at least one vapor compression system portion configured to operate during a pull down mode and a thermoelectric portion that includes a thermoelectric device positioned outside the vacuum insulated cabinet structure and a coolant loop operably connected to a coolant tubing positioned between the interior wall and the exterior wall in thermal communication with a refrigerator compartment or a heat exchanger positioned within the refrigerator compartment of the vacuum insulated cabinet structure and wherein the thermoelectric cooling portion is configured to operate in a steady-state mode without the vapor compression system operating while providing sufficient cooling to offset the steady-state heat load of the refrigerator compartment of the appliance.

14. The appliance of claim 13, wherein the vapor compression system portion only operates solely in a pull down mode and the thermoelectric device operates in a steady-state mode when the appliance is not in a pull down mode.

15. The appliance of claim 13, wherein the vapor compression system portion operates after the interior of the appliance has been opened to an ambient, after a power outage, or upon initial startup of the appliance.

16. The appliance of claim 15, wherein the vapor compression system portion only operates after the interior of the appliance has been opened to an ambient, after a power outage, or upon initial startup of the appliance and the thermoelectric portion operates substantially constantly.

17. The appliance of claim 15, wherein the vapor compression system portion comprises a compressor, a condenser, a throttling device, and an evaporator positioned within an interior volume of the vacuum insulated cabinet structure and a plurality of coolant fluid conduits that fluidly interconnect the components of the vapor compression system portion and wherein the thermoelectric portion is positioned in thermal communication with the refrigerator compartment of the appliance.

18. A method of cooling an appliance having a pull down mode and a steady-state mode comprising the steps of:
using a vapor compression circuit that includes a compressor, a condenser, a throttling device, and an evaporator or vapor compression circuit coolant tubing during a pull down mode to provide convective cooling to an interior volume of the appliance wherein the appliance is constructed of a vacuum insulated cabinet and at least one vacuum insulated door to enclose the interior volume of the appliance; and
using a thermoelectric cooling circuit comprising a thermoelectric device fluidly connected by coolant conduits to an evaporator or thermoelectric cooling circuit coolant tubing during a steady-state mode to provide convective cooling to an interior volume of the appliance.

19. The method of claim 18, wherein the vapor compression circuit operates independently from the thermoelectric cooling circuit and the vapor compression circuit only during the pull down mode and the thermoelectric cooling circuit operates at least substantially constantly when the appliance is powered.

* * * * *